The United States Patent

(12) United States Patent
Koyanagi et al.

(10) Patent No.: US 6,547,143 B2
(45) Date of Patent: Apr. 15, 2003

(54) BAR-CODE READER AND BAR-CODE READING METHOD PROVIDING DISPLAY AND CORRECTION OF QUESTIONABLE CHARACTERS

(75) Inventors: Norio Koyanagi, Kawasaki (JP); Mitsuharu Ishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/078,472

(22) Filed: Feb. 21, 2002

(65) Prior Publication Data
US 2002/0074407 A1 Jun. 20, 2002

Related U.S. Application Data

(63) Continuation of application No. PCT/JP99/05880, filed on Oct. 25, 1999.

(51) Int. Cl.⁷ .......................... G02B 26/10; G06K 7/10; G06K 9/22; G06K 19/06
(52) U.S. Cl. ................... 235/462.25; 235/437
(58) Field of Search .................. 235/437, 454, 235/462.01, 462.07, 462.16, 462.17, 462.18, 462.19, 462.25, 462.27, 462.28; 382/159, 311; 209/546

(56) References Cited

U.S. PATENT DOCUMENTS

| 4,205,780 A | * | 6/1980 | Burns et al. ................. 235/454 |
| 4,414,468 A | * | 11/1983 | Laurer et al. .......... 235/462.07 |
| 4,421,978 A | * | 12/1983 | Laurer et al. .......... 235/462.07 |
| 4,914,709 A | * | 4/1990 | Rudak ......................... 382/311 |
| 5,394,484 A | * | 2/1995 | Casey et al. ................. 382/159 |
| 5,451,761 A | * | 9/1995 | Kawai et al. .......... 235/462.07 |
| 5,525,784 A | * | 6/1996 | Kawai et al. ................. 235/437 |
| 5,525,785 A | * | 6/1996 | Kawai et al. ................. 235/437 |
| 5,697,504 A | * | 12/1997 | Hiramatsu et al. ........... 209/546 |
| 5,767,498 A | | 6/1998 | Heske, III et al. |
| 5,773,807 A | * | 6/1998 | Barkan et al. .......... 235/462.27 |
| 5,929,423 A | * | 7/1999 | Boersma et al. |
| 5,930,409 A | * | 7/1999 | Ohtani ......................... 381/311 |
| 5,959,282 A | | 9/1999 | Tabuchi |
| 6,299,064 B2 | * | 10/2001 | Watanabe et al. ....... 235/462.16 |
| 6,357,660 B1 | * | 3/2002 | Watanabe et al. ....... 235/462.16 |

FOREIGN PATENT DOCUMENTS

| JP | 57-148243 | | 9/1982 |
| JP | 1-302481 A | * | 12/1989 |
| JP | 2-128289 | | 5/1990 |
| JP | 4-283888 | | 10/1992 |
| JP | 5-114041 | | 5/1993 |
| JP | 6-139396 | | 5/1994 |
| JP | 6-348886 | | 12/1994 |
| JP | 7-220170 | | 8/1995 |
| JP | 7-43710 | | 9/1995 |
| JP | 8-287181 | | 11/1996 |
| JP | 9-6885 | | 1/1997 |
| JP | 10-91715 A | * | 4/1998 |
| JP | 10-105643 | | 4/1998 |

* cited by examiner

Primary Examiner—Michael G. Lee
Assistant Examiner—Jared J. Fureman
(74) Attorney, Agent, or Firm—Armstrong, Westerman & Hattori, LLP

(57) ABSTRACT

A device and method to read bar-codes in which a ratio of a number of modules is compared to a reference module width character included in a bar-code. The number of modules is rounded up and off based upon the number of modules that includes the error component. When the error amount in the ratio exceeds a permissible value, the character in question is demodulated based on the resulting rounding up or off.

4 Claims, 14 Drawing Sheets

FIG.3

QUESTIONABLE CHARACTER TABLE T ~ Dm

| DEMODULATION DATA (CORRECT) | 2 | 0 | 0 | 0 | 0 | 2 | 8 | 9 | 6 | 3 | 2 | NUMBER |
|---|---|---|---|---|---|---|---|---|---|---|---|---|
| DEMODULATION DATA INCLUDING QUESTIONABLE CHARACTERS | 2 | 0 | 0 | 0 | 0 | 0*8 | 8 | 9 | 6 | 3 | 2 | 1 |
|  | 2 | 0 | 0 | 0 | 0 | 0*8 | 8 | 9 | 6 | 3*2 | | 5 |
|  | 2 | 0 | 0 | 0 | 0 | 0 | 2 | 8 | 9 | 6 | 3*8 | 4 |
|  | 2 | 0 | 0 | 0 | 0 | 0*8 | 8 | 9 | 6 | 3*8 | | 12 |

| DEMODULATION DATA (CORRECT) | 6 | 9 | 2 | 0 | 1 | 9 | 3 | 2 | 3 | 2 | 4 | 1 | 2 | NUMBER |
|---|---|---|---|---|---|---|---|---|---|---|---|---|---|---|
| DEMODULATION DATA INCLUDING QUESTIONABLE CHARACTERS | 6 | 9 | 2 | 0 | 1 | 9 | 3 | 2 | 3 | 2 | 4*7 | | 2 | 9 |
|  | 6 | 9*8 | | 0 | 1 | 9 | 3 | 2 | 3 | 2 | 4*1 | | 2 | 1 |

FIG.13
PRIOR ART 100

| T1\T2 | 2 | 3 | 4 | 5 |
|---|---|---|---|---|
| 2 | E6 | O0 | E4 | O3 |
| 3 | O9 | E2 / E8 | O1 / O7 | E5 |
| 4 | E9 | O2 / O8 | E1 / E7 | O5 |
| 5 | O6 | E0 | O4 | E3 |

FIG.14
PRIOR ART 200

| B1\B3 | 1 | 2 | 3 |
|---|---|---|---|
| 1 | E7 / E8 | O1 | — |
| 2 | O2 | E1 / E2 | O7 |
| 3 | — | O8 | — |

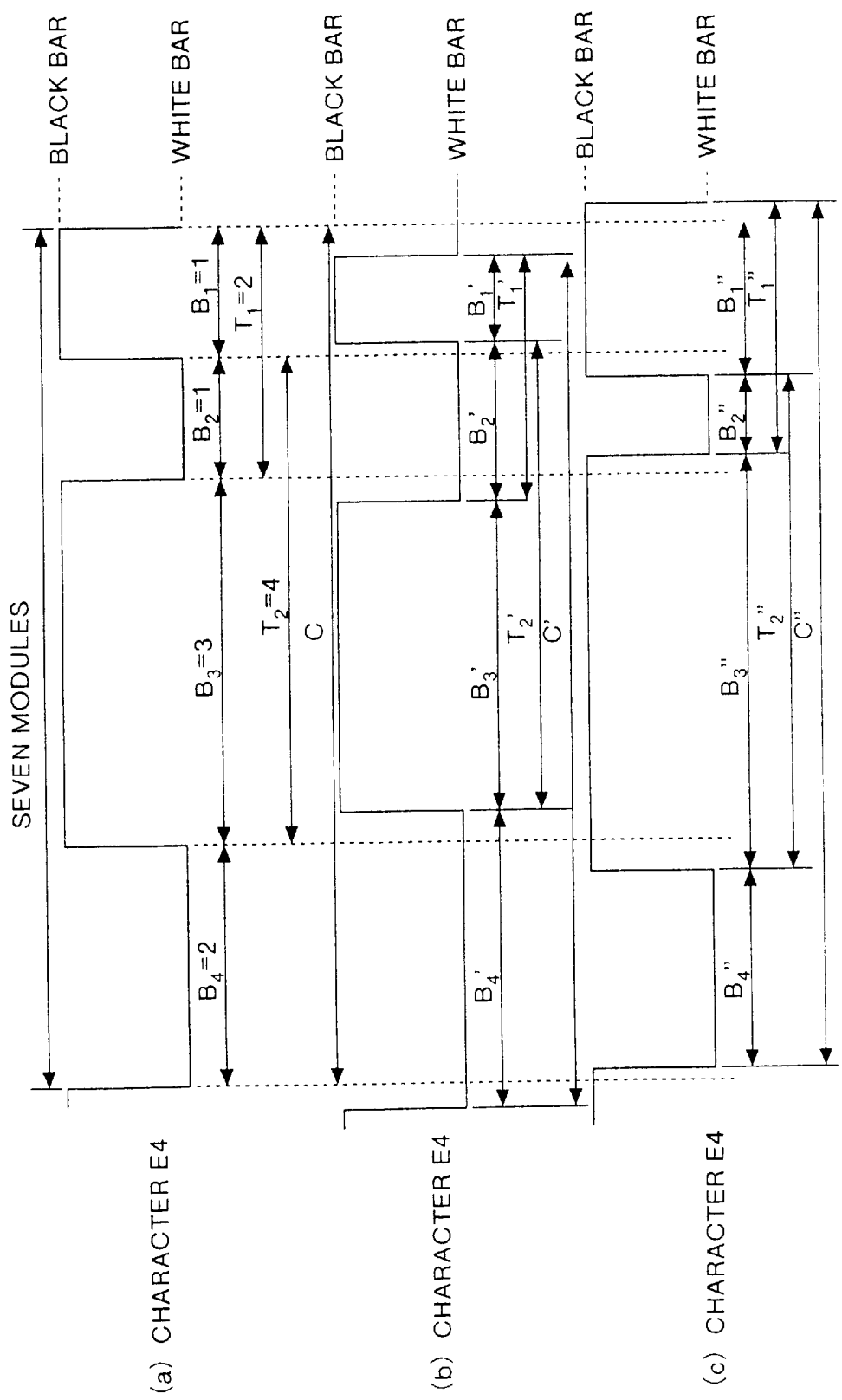

BAR-CODE READER AND BAR-CODE READING METHOD PROVIDING DISPLAY AND CORRECTION OF QUESTIONABLE CHARACTERS

This application is a continuation of international application PCT/JP99/05880 filed on Oct. 25, 1999.

TECHNICAL FIELD

The present invention relates to a bar-code reader and a bar-code reading method for optically reading bar codes by scanning bar codes that express characters based on bar width, with laser beams.

BACKGROUND ART

Recently, POS (point of sales) systems have been diffused rapidly in retail shops, particularly, in convenience stores, department stores, supermarkets, etc, in order to quickly understand the contents of sales of products and to save manpower. In the POS system, there is built in a bar-code reader for optically reading bar codes that express characters, and decoding these characters based on the read result of the bar codes.

There may arise variances in the bar widths of the bar codes that are attached to goods, depending on print precision levels. Therefore, the bar-code reader is required to decode characters in high precision without being affected by the variances in the bar widths.

FIG. 8 is a block diagram showing a structure of a conventional bar-code reader. In this drawing, a bar code 10 is attached to goods not shown. The bar code consists of a plurality of black bars and white bars that are combined together in alternate order, to express twenty kinds of characters in total including E (EVEN) 0 to E9 and O (ODD) 0 to O9. As this bar code 10, there are EAN (European Article Number) that is used invarious countries in the world, and UPC (Universal Product Code) that is used in America.

FIG. 9 is a top plan view which shows the bar code 10. The bar code 10 shown in this drawing has black bars $BB_1$, white bars $WB_1$, black bars $BB_2$, and white bars $WB_2$ that are laid out alternately, as an example. Further, this bar code 10 is constructed of a left margin LM, a left guard bar LGB that includes a black bar $LGB_1$ and a white bar $LGB_2$, a left data character 10L that consists of six characters (for example, "000000"), a center bar CB, a right data character 10R that consists of five characters (for example, "128963"), a check digit code CD that consists of one character (for example, "2"), a right guard bar RGB that includes a white bar $RGB_1$ and a black bar $RGB_2$, and a right margin RM, in the order from the left to the right in the drawing.

In this drawing, a country code $C_1$ is "20", a goods maker code $C_2$ is "00000", a goods item code $C_3$ is "28963", and a check digit code CD is "2". This check digit code CD is a code that is used for a calculation check (for example, a modulus ten check) for increasing the reliability (precision) of the bar-code data.

One character in the bar code 10 is constructed of four bars (elements) including a first black bar, a second white bar, a third black bar, and a fourth white bar, in the order from the right to the left, as shown in FIG. 10(a) to FIG. 10(d). A character length C (a distance from the edge of the first black bar to the edge of the fourth white bar) is set to have seven modules (a unit length is called a "module").

Further, the bar code 10 expresses ten kinds of numbers (characters) from "0" to "9", based on the combination of a black-bar width $B_1$ of the first black bar, a white-bar width $B_2$ of the second white bar, a black-bar width $B_3$ of the third black bar, and a white-bar width $B_4$ of the fourth white bar. Further, the bar code 10 can express twenty kinds of characters with the same number, by introducing a combination of two kinds of an odd number and an even number for the number of modules of the black bars, as shown in FIG. 11.

A number of modules of black bars that becomes an odd number will be called ODD (hereinafter to be abbreviated as O), and, on the other hand, a number of modules of black bars that becomes an even number will be called EVEN (hereinafter to be abbreviated as E). FIG. 11 shows an example of twenty kinds of characters in total that includes ten kinds of characters from a character O0 to a character O9 for which the number of modules of black bars becomes an odd number respectively, and ten kinds of characters from a character E0 to a character E9 for which the number of modules of black bars becomes an even number respectively.

The character O0 and the character E0 shown in the drawing will be explained as an example. The character O0 is constructed of a first black bar (the number of modules is one), a second white bar (the number of modules is one), a third black bar (the number of modules is two), and a fourth white bar (the number of modules is three), in the order from the right to the left in the drawing. Further, the character O0 has three modules as the sum of the number of modules of the first black bar (=1) and the number of modules of the third black bar (=2), that is, an odd number.

On the other hand, the character E0 is constructed of a first black bar (the number of modules is three), a second white bar (the number of modules is two), a third black bar (the number of modules is one), and a fourth white bar (the number of modules is one), in the order from the right to the left in the drawing. Further, the character E0 has four modules as the sum of the number of modules of the first black bar (=3) and the number of modules of the third black bar (=1), that is, an even number.

A character E4 shown in FIG. 10(a) is constructed of a black bar having one module for the black-bar width $B_1$, a white bar having one module for the white-bar width $B_2$ that is adjacent to this black bar, a black bar having three modules for the black-bar width $B_3$ that is adjacent to this white bar, and a white bar having two modules for the white-bar width $B_4$ that is adjacent to this black bar, in the order from the right to the left in this drawing.

The sum of the black-bar width $B_1$ and the white-bar width $B_2$, that is a distance from the edge of the first black bar to the edge the second white bar, is called a delta distance $T_1$. In the example shown in this drawing, this delta distance $T_1$ is two modules. Further, the sum of the white-bar width $B_2$ and the black-bar width $B_3$, that is a distance from the edge of the second white bar to the edge the third black bar, is called a delta distance $T_2$. In the example shown in this drawing, this delta distance $T_2$ is four modules.

The delta distance $T_1$, the delta distance $T_2$, the black-bar width $B_1$, and the black bar $B_3$ are important parameters that are used to decide which one of the character O0 to the character O9 and the character E0 to the character E9 shown in FIG. 11 the character belongs to.

In other words, in FIG. 11, the delta distance $T_1$ and the delta distance $T_2$ for each one of the character O0 to the character O9 and the character E0 to the character E9 are different from those delta distance of the other characters. Therefore, it is possible to decide a character from the delta distance $T_1$ and the delta distance $T_2$. For making this decision, a first demodulation table 100 of FIG. 13 is used that shows a relationship between each pattern of combination of the delta distance $T_1$ and the delta distance $T_2$, and each character.

However, as shown in FIG. 13, the character E2 and the character E8, the character O2 and the character O8, the character O1 and the character O7, and the character E1 and the character E7 respectively have the same combination values for the delta distance $T_1$ and the delta distance $T_2$. Therefore, it is not possible to decide these characters based on the delta distance $T_1$ and the delta distance $T_2$.

Specifically, taking an example of the character E2 and the character E8, both characters have the same values for the delta distance $T_1$ as three modules and the delta distance $T_2$ as three modules. Therefore, based on only the delta distance $T_1$ and the delta distance $T_2$, it is not possible to decide whether the character is the character E2 or the character E8.

Accordingly, between the character E2 and the character E8, between the character O2 and the character O8, between the character O1 and the character O7, and between the character E1 and the character E7 respectively, it is possible to discriminate between these characters based on a difference between the black-bar width of the first black bar and the black-bar width of the third black bar, as these black-bar widths are different between these characters.

Specifically, taking an example of the character E2 and the character E8 shown in FIG. 11, the character E2 has two modules for the black-bar width of the first black bar, and two modules for the black-bar width of the third black bar. On the other hand, the E8 has one module for the black-bar width of the first black bar, and one module for the black-bar width of the third black bar, and these numbers are different from those of the character E2. Therefore, it is possible to discriminate between the character E2 and the character E8, based on the black-bar width of the first black bar and the black-bar width of the third black bar.

Further, for discriminating between the character O1 and the character E1, between the character O2 and the character E2, between the character O7 and the character E7, and between the character O8 and the character E8, which it is not possible to decide based on the first demodulation table 100 (refer to FIG. 13), a second demodulation table 200 of FIG. 14 is used that shows a relationship between each pattern of combination of the black-bar width $B_1$ of the first black bar and the black-bar width $B_3$ of the third black bar, and each character.

Referring back to FIG. 8, a photoelectric converter 2 in a scanner 1 is for optically reading the bar code 10, and outputting a result of the reading as a read signal Sb. This photoelectric converter 2 is constructed of a laser oscillator (not shown) for irradiating laser beams L onto the bar code 10, and a light receiver (not shown) for receiving the laser beams L reflected from the bar code 10, and then generating a read signal Sb shown in FIG. 2(b).

The levels of the read signal Sb correspond to a black bar $BB_1$, a white bar $WB_1$, a black bar $BB_2$, and a white bar $WB_2$ shown in FIG. 2(a). In other words, as the light reflectance is low for a black bar $LGB_1$, the black bar $BB_1$, and the black bar $BB_2$ respectively, the corresponding levels of the read signal Sb become low. On the other hand, as the light reflectance is high for the white bar $WB_1$, the white bar$B_2$, and a white bar $LGB_2$ respectively, the corresponding levels of the read signal Sb become high.

An A/D (analog/digital) converter 3 compares the read signal Sb from the photoelectric converter 2 with a threshold value, thereby to change (digitize) the read Sb into a binary data. A clock signal generator 4 generates a clock signal Sc having a predetermined period. A bar-width counter 5 counts up in synchronism with the period of the clock signal Sc supplied from the clock signal generator 4, and measures as count values a black-bar width $B_1$, a white-bar width $B_2$, a white-bar width $B_3$, a black-bar width $B_4$, a white-bar width $B_5$, and a black-bar width $B_6$, out of the read signal Sb digitized by the A/D converter 3, as shown in FIG. 2(b)

In the example shown in FIG. 2(c), the black-bar width $B_1$ has 25 counts, the white-bar width $B_2$ has 25 counts, the white-bar width $B_3$ has 200 counts, the black-bar width $B_4$ has 100 counts, the white-bar width $B_5$ has 50 counts, and the black-bar width $B_6$ has 50 counts. Referring back to FIG. 8, a storage 7 stores the count value data of the bar-width counter 5 by relating these values to the black-bar width $B_1$, the white-bar width $B_2$, and so on respectively, as shown in FIG. 2(d).

The storage 7 also stores the first demodulation table 100 (refer to FIG. 13), the second demodulation table 200 (refer to FIG. 14), and a program that is executed by a scanner controller 6.

The scanner controller 6 demodulates characters of the bar code 10, based on the count value data from the bar-width counter 5, the first demodulation table 100 (refer to FIG. 13), and the second demodulation table 200 (refer to FIG. 14), and outputs a result of the demodulation as a demodulation data $D_m$. The operation of the scanner controller 6 will be explained in detail later.

A communication section 8 transmits the demodulation $D_m$ from the scanner controller 6 to a POS device 9. The POS device 9 displays prices of goods (not shown) and names of the goods that are attached with the bar codes 10, and generates sales management information, based on the demodulation $D_m$.

Next, the operation of the conventional bar-code reader will be explained with reference to a flowchart shown in FIG. 12.

When the print precision of the bar code 10 is aggravated, a black-bar width may become narrower to have a thinner black bar as compared with a normal black-bar width, or on the contrary, the black-bar width may become larger to have a thicker black bar as compared with the normal black-bar width.

Specifically, FIG. 15(b) shows an example of a case where black-bar widths become thinner like a black-bar width $B_1'$ and a black-bar width $B_3'$ as compared with a normal black-bar width $B_1$ and a normal black-bar width $B_3$ respectively (refer to FIG. 15(a)). FIG. 15(c) shows an example of a case where black-bar widths become thicker like a black-bar width $B_1''$ and a black-bar width $B_3''$ as compared with the normal black-bar width $B_1$ and the normal black-bar width $B_3$ respectively (refer to FIG. 15 (a)).

When the black bars of the bar code 10 have become thinner or thicker as explained above, the delta distance $T_1$, the delta distance $T_2$, the black-bar width $B_1$, and the black bar $B_3$ change from those of the normal bar code 10. Therefore, this has a possibility of producing an erroneous result of demodulation when characters are demodulated. The conventional bar-code reader explained below receives bad influences of the thinned or thickened black-bar widths of the bar code 10.

In FIG. 8, when the laser beams L have been irradiated onto the bar code 10 from the laser oscillator (not shown) of the photoelectric converter 2 for reading the bar code, the laser beams L are reflected at the reflectance corresponding to the distribution of black bars and white bars of the bar code 10. Then, the reflected laser beams L are received by the receiver (not shown) of the photoelectric converter 2. Consequently, in the receiver of the photoelectric converter 2, the reflected beams are converted into the read signal Sb having the waveform as shown in FIG. 2(b), and then the read signal Sb is output to the A/D converter 3. The A/D converter 3 compares the input read signal Sb with a threshold value, and changes the read signal Sb into a binary data. The binary read signal Sb is counted by the bar-width counter 5. The counted result is delivered to the scanner controller 6.

The scanner controller 6 proceeds to step SA1 shown in FIG. 12, and decides whether a start code or a stop code has been detected or not, based on the counted result. When a result of this decision made is "No", the same process of making a decision is repeated. In this case, the start code means a code corresponding to the left guard bar LGB (or the right guard bar RGB) shown in FIG. 9, and the stop code means a code corresponding to the right guard bar RGB (or the left guard bar LGB).

When a start code corresponding to the left guard bar LGB has been detected, the scanner controller 6 sets "Yes" as a result of the decision made, and proceeds to step SA2. At step SA2, the scanner controller 6 stores the black-bar width $B_1$ of the black bar $LGB_1$ (=25 counts) shown in FIG. 2(a) and FIG. 2(b) into the storage 7, as a reference module width, and then proceeds to step SA3.

At step SA3, the scanner controller 6 decides whether black bars and white bars corresponding to one character have been scanned or not. When a result of the decision made is "No", the same process of making a decision is repeated. In this case the black bars and the white bars corresponding to one character mean the black bars and the white bars that express the character E4 shown in FIG. 10(a), for example. When a result of the decision made at step SA3 is "Yes", the scanner controller 6 proceeds to step SA4.

At step SA4, the scanner controller 6 decides whether or not the number of modules as a result of totaling the white bars and the black bars for one character scanned at step SA3 (that is, seven modules, when there is no thinning in black or thickening in black) is an integer times the number of the reference modules. When a result of the decision made is "Yes", the scanner controller 6 proceeds to step SA5. When the character has been thinned in black or thickened in black as shown in FIG. 15(b) or FIG. 15(c), the number of modules for one character does not become an integer times the number of the reference modules. Therefore, in this case, the scanner controller 6 sets "No" as a result of decision made at step SA4, and then proceeds to step SA12.

At step SA12, the scanner controller 6 decides whether a value of a decimal point portion (an error) of a ratio of the number of modules for one character to the number of the reference modules is equal to or less than a permissible value (for example, ±0.3) or not. When a result of the decision made is "No", the scanner controller 6 proceeds to step SA13. At step SA13, the scanner controller 6 makes the demodulation data $D_m$ invalid, and then returns to step SA1 to repeat the above operation according to the next character.

On the other hand, when a result of the decision made at step SA12 is "Yes", the scanner controller 6 proceeds to step SA5, and demodulates the character by using the first demodulation table 100 (refer to FIG. 13) and the second demodulation table 200 (refer to FIG. 14). Then, the scanner controller 6 proceeds to step SA6. At step SA6, the scanner controller 6 decides whether a stop code or a start code has been detected or not. When a result of the decision made is "No", the scanner controller 6 returns to step SA3, and repeats the above operation according to the next character.

When a result of the decision made at step SA6 becomes "Yes", that is, when the demodulation of all the characters of the bar code 10 has been finished, the scanner controller 6 proceeds to step SA7. At step SA7, the scanner controller 6 calculates a check digit based on a known modulus 10, and then proceeds to step SA8.

Specifically, the scanner controller 6 checks whether the check digit calculated at step SA7 coincides with the check digit code CD the character actually demodulated (refer to FIG. 9), and decides whether the check result has been correct or not. When the check digit calculated at step SA7 coincides with the check digit code CD of the character actually demodulated, the check result is correct. When the check digit calculated at step SA7 does not coincide with the check digit code CD of the character actually demodulated, the check result is abnormal. When a result of the decision made at step SA8 is "No", the scanner controller 6 proceeds to step SA13, and destroys the demodulation data $D_m$. Then, the scanner controller 6 returns to step SA1. On the other hand, when a result of the decision made at step SA8 is "Yes", the scanner controller 6 proceeds to step SA9. At step SA9, the scanner controller 6 gives a correct-reading sound to notify that the reading has been correct, and then proceeds to step SA10.

At step SA10, the scanner controller 6 edits the demodulation data $D_m$, and then proceeds to step SA11. At step SA11, the scanner controller 6 transmits the edited demodulation data $D_m$ to the POS device 9 via the communication section 8, and returns to step SA1. Consequently, the POS device 9 recognizes the character corresponding to the bar code 10 based on the demodulation data $D_m$.

According to the conventional bar-code reader, when an error exceeds a permissible value, the demodulation data $D_m$ is made invalid indiscriminately, that is, the reading result of the bar code 10 is made as an error, as explained at step SA12 (refer to FIG. 12). The main cause of the occurrence of this error is that the print precision of the bar code 10 does not satisfy the permissible value. In this case, the operator must visually confirm the code (2000000289632: refer to FIG. 9) of the bar code 10, and then manually input all of this code.

However, it is very troublesome to manually input all the code, and this also takes time. Accordingly, it is very inconvenient for the operator to use this bar-code reader, and the operator tends to dislike this bar-code reader. In the worst case, even if the reading precision of the bar-code reader satisfies a reference value, the maker of the bar-code reader is pressed by the user to change the type of the bar-code reader or to change the maker of the bar-code reader.

Accordingly, it is an object of the present invention to provide a bar-code reader and a bar-code reading method capable of reading a bar code without generating a load on the operator even if the print precision of the bar code does not satisfy a permissible value.

DISCLOSURE OF THE INVENTION

In order to achieve the above object, in a bar-code reader according to the present invention, the bar-code reader is for demodulating a character based on the number of modules obtained by reading a bar code that expresses the character in a plurality of bar widths, and the bar-code reader comprises, a ratio calculation unit (corresponding to a scanner controller 25 in one embodiment to be described later) that obtains a ratio of a number of modules to a reference module width of the character, a correction unit (corresponding to the scanner controller 25 in one embodiment to be described later) that corrects the number of modules that includes an error component, when the error amount in the ratio exceeds a permissible value, a demodulation unit (corresponding to the scanner controller 25 in one embodiment to be described later) which demodulates a character, based on the number of modules of the character and the number of modules corrected by the correction unit, a display unit (corresponding to an operator display 34 in one embodiment to be described later) that displays a marked questionable character corresponding to the corrected number of modules, in a result of demodulation by the demodulation unit, and an input unit (corresponding to a keyboard 36 in one embodiment to be described later) which inputs a correct character based on the display of the display unit.

According to this invention, in a bar code of low print precision, a black-bar width becomes thicker or thinner relative to a reference value. When this bar code has been read, a ratio of a number of modules to a reference module width of a character does not become an integer. Therefore, when an error amount of the ratio exceeds a permissible value, the correction unit corrects the number of modules that includes an error component. In this case, the display unit displays a marked questionable character that corresponds to the corrected number of modules, in a result of demodulation by the demodulation unit. Based on this display, a correct character is input from the input unit.

As explained above, according to the present invention, a number of modules that includes an error component is corrected, and a character that is basically a reading error is displayed by the display unit as a questionable character that is attached with a mark. Then, a correct character corresponding to this questionable character is input. Therefore, it is not necessary to input all characters of the bar code. As a result, it is possible to reduce the load of the operator.

Further, in a bar-code reader according to the present invention, in the above bar-code reader, the bar-code reader comprises, a memory unit (corresponding to a storage 26 in one embodiment to be described later) that stores a table for expressing a relationship between a result of correct demodulation obtained by replacing the questionable character in the result of demodulation by the demodulation unit with the correct character input by the input unit, and a result of demodulation that includes the questionable character, a count unit (corresponding to the scanner controller 25 in one embodiment to be described later) that counts the number of times when the result of demodulation that includes the questionable character in the table has been obtained, and a control unit (corresponding to the scanner controller 25 and a POS controller 31 in one embodiment to be described later) that makes the display unit display the result of correct demodulation in the table when the result of counting by the count unit is equal to or above a threshold value, in the case where a result of demodulation that includes the questionable character has been obtained by the demodulation unit and also when the result of demodulation exists in the table.

According to this invention, when a result of demodulation that includes the questionable character has been obtained by the demodulation unit and also when the result of demodulation exists in the table, the result of correct demodulation in the table is displayed by the display unit when the result of counting by the count unit is equal to or above a threshold value, without involving an input of the correct character by the input unit.

As explained above, according to the present invention, the table and the count unit are provided. When the result of counting by the count unit is equal to or above a threshold value, the questionable character is regarded as a correct character, and the result of correct demodulation in the table is displayed by the display unit. Therefore, a troublesome input operation by the operator is not necessary. As a result, it is possible to read the bar code without applying load to the operator.

Further, in a bar-code reader according to the present invention, in the above bar-code reader, the display unit displays the questionable character based on a display method different from that used for displaying other characters.

According to this invention, the display unit can display questionable characters distinctly differently from other characters based on different display methods. Therefore, it is possible to input the correct character easily from the input unit.

Further, in a bar-code reader according to the present invention, in the above bar-code reader, the display unit replaces the questionable character with the correct character that has been input by the input unit, and displays all characters in the same display method.

According to this invention, when the correct character has been input by the input unit, the questionable character is replaced with the correct character. At the same time, all characters are displayed in the same display method. Therefore, the operator can instantly recognize that the questionable character has been replaced.

Further, in a bar-code reader according to the present invention, the bar-code reader is for reading a bar code that is constructed of a plurality of characters, and demodulating the bar code, and the bar-code reader comprises, a decision unit (corresponding to the scanner controller 25 in one embodiment to be described later) that decides presence or absence of a questionable character having a possibility of erroneous reading among the characters included in the bar code, a display unit (corresponding to the operator display 34 in one embodiment to be described later) that displays a result of demodulating the bar code, and a control unit (corresponding to the scanner controller 25 in one embodiment to be described later) that makes the display unit display the questionable character included in the result of demodulation distinctly differently from other characters, when the decision unit has decided that there is the questionable character.

According to this invention, in a bar code of low print precision, a black-bar width becomes thicker or thinner relative to a reference value. When this bar code has been read, the decision unit decides presence or absence of a questionable character having a possibility of erroneous reading. When it has been decided that there is a questionable character, the control unit makes the display unit display the questionable character included in the result of demodulation distinctly differently from other characters.

As explained above, according to the present invention, it is possible to make the display unit display the questionable character distinctly differently from other characters, based on different display methods.

Further, in a bar-code reader according to the present invention, in the above bar-code reader, the bar-code reader comprises an input unit (corresponding to the keyboard 36 in one embodiment to be described later) which inputs a correct character corresponding to the questionable character, wherein the control unit replaces the questionable character with the correct character, and outputs a result of demodulation that includes the correct character as a result of corrected demodulation.

According to this invention, a character is corrected by replacing a questionable character with a correct character, based on the input from the input unit. Therefore, it is not necessary to input all characters of the bar code. As a result, it is possible to reduce the load of the operator.

Further, in a bar-code reader according to the present invention, in the above bar-code reader, the bar-code reader comprises, a memory unit (corresponding to the storage 26 in one embodiment to be described later) that stores the result of demodulation that includes the questionable character and the result of corrected demodulation, by relating these results to each other, and a comparison unit (corresponding to the scanner controller 25 in one embodiment to be described later) that compares the result of demodulating the bar code with the result of demodulation that includes the questionable character that is stored in the memory unit, wherein when the comparison unit shows a result of the comparison that both results of demodulation coincide with each other, the control unit outputs the result of corrected demodulation that is stored in the memory unit in place of the result of demodulating the bar code.

According to this invention, when a result of demodulation that includes a questionable character has been obtained and also when a result of demodulation that is the same as this result of demodulation exists in the memory unit, the control unit outputs the result of corrected demodulation in place of the result of demodulating the bar code. Therefore, a troublesome input operation by the operator is not necessary. As a result, it is possible to read the bar code without applying load to the operator.

Further, in a bar-code reading method according to the present invention, the bar-code reading method is for demodulating a character based on the number of modules obtained by reading a bar code that expresses the character in a plurality of bar widths, and the bar-code reading method comprises, a ratio calculation step (corresponding to a step SB2 in one embodiment to be described later) that obtains a ratio of a number of modules to a reference module width of the character, a correction step (corresponding to a step SB15 in one embodiment to be described later) that corrects the number of modules that includes an error component, when the error amount in the ratio exceeds a permissible value, a demodulation step (corresponding to a step SB16 in one embodiment to be described later) that demodulates a character, based on the number of modules of the character and the number of modules corrected at the correction step, a display step (corresponding to a step SC3 in one embodiment to be described later) that makes a display unit display a marked questionable character corresponding to the corrected number of modules, in a result of demodulation at the demodulation step, and an input step (corresponding to a step SC4 in one embodiment to be described later) that inputs a correct character based on the display of the display unit.

According to this invention, in a bar code of low print precision, a black-bar width becomes thicker or thinner relative to a reference value. When this bar code has been read, a ratio of a number of modules to a reference module width of a character does not become an integer. Therefore, when an error amount of the ratio exceeds a permissible value, the number of modules that includes an error component is corrected, at the correction step. In this case, the display unit displays a marked questionable character that corresponds to the corrected number of modules, in a result of demodulation at the demodulation step. Based on this display, a correct character is input at the input step.

As explained above, according to the present invention, a number of modules that includes an error component is corrected, and a character that is basically a reading error is displayed by the display unit as a questionable character that is attached with a mark. Then, a correct character corresponding to this questionable character is input. Therefore, it is not necessary to input all characters of the bar code. As a result, it is possible to reduce the load of the operator.

BRIEF DESCRIPTION OF DRAWINGS

FIG. 3 is a diagram showing one example of a questionable character table T in the same embodiment;

FIG. 13 is a diagram showing a first demodulation table 100;

FIG. 14 is a diagram showing a second demodulation table 200; and

FIG. 15 is a diagram for explaining a status that a character has been thinned in black and has been thickened in black in total.

BEST MODE OF CARRYING OUT THE INVENTION

The present invention will be explained in detail with reference to the attached drawings.

Figure 1:
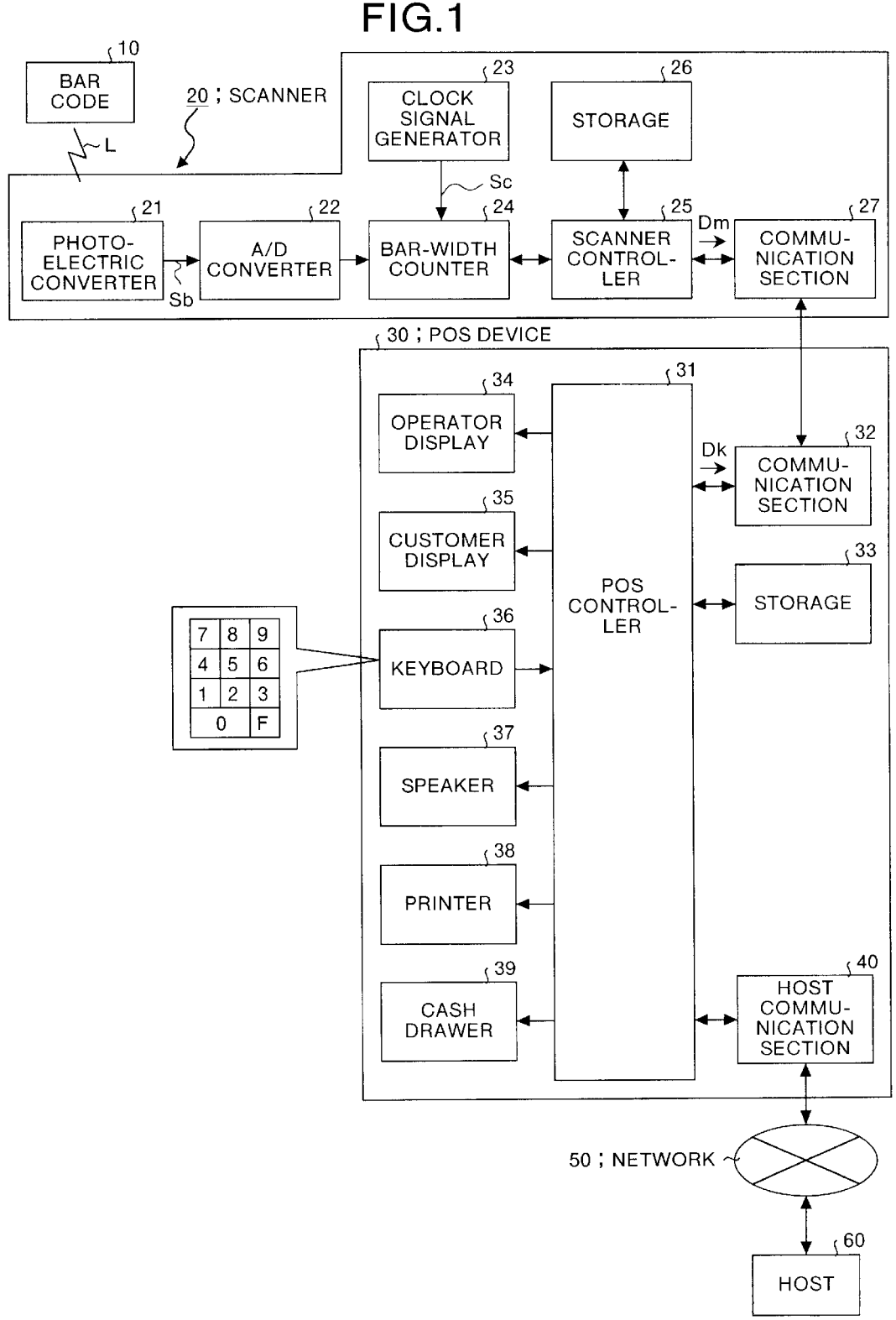
FIG. 1 is a block diagram showing a structure of one embodiment according to the present invention.
Figure 8:
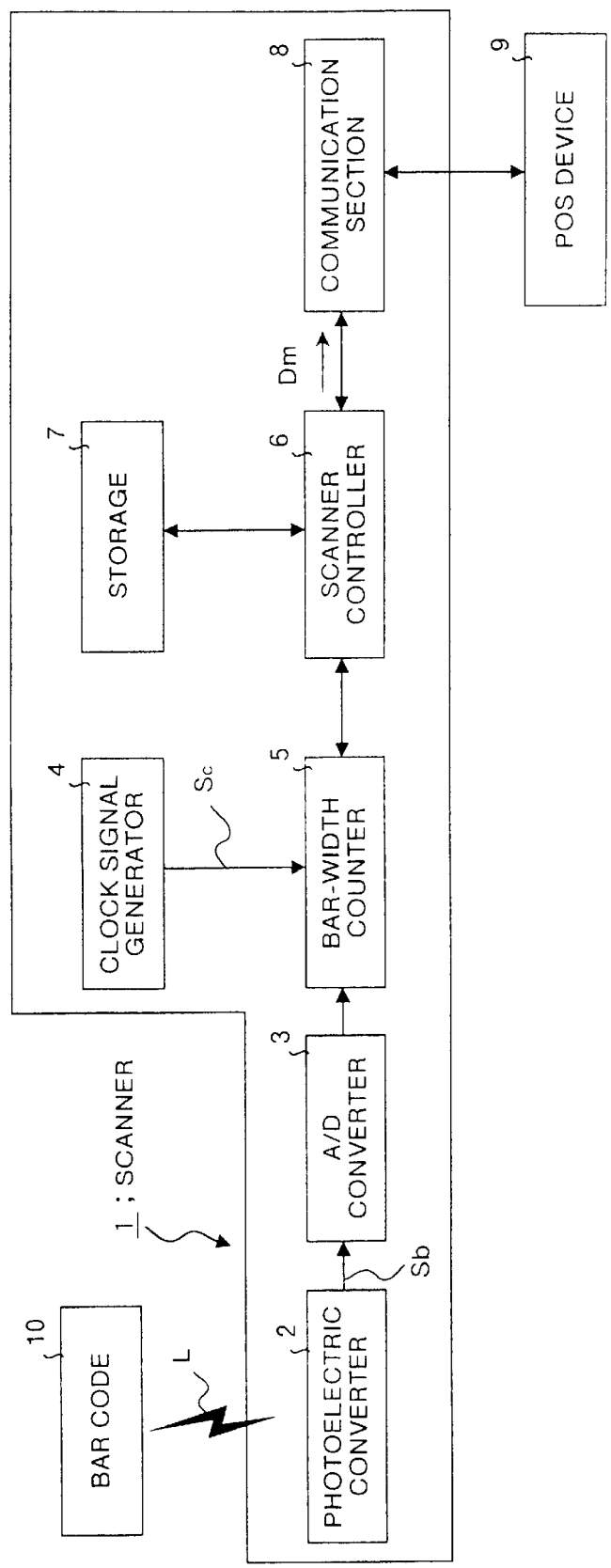
FIG. 8 is a block diagram showing a structure of a conventional bar-code reader.

FIG. 1 is a block diagram showing a structure of one embodiment. In this drawing, portions corresponding to those in FIG. 8 are attached with like reference numbers. A photoelectric converter 21 in a scanner 20 is for optically reading a bar code 10, and outputting a result of the reading as a read signal Sb, in a similar manner to that of the above photoelectric converter 2 (refer to FIG. 8). This photoelectric converter 21 is constructed of a laser oscillator (not shown) for irradiating laser beams L onto the bar code 10, and a light receiver (not shown) for receiving the laser beams L reflected from the bar code 10, and then generating a read signal Sb shown in FIG. 2(*b*).

Figure 2:
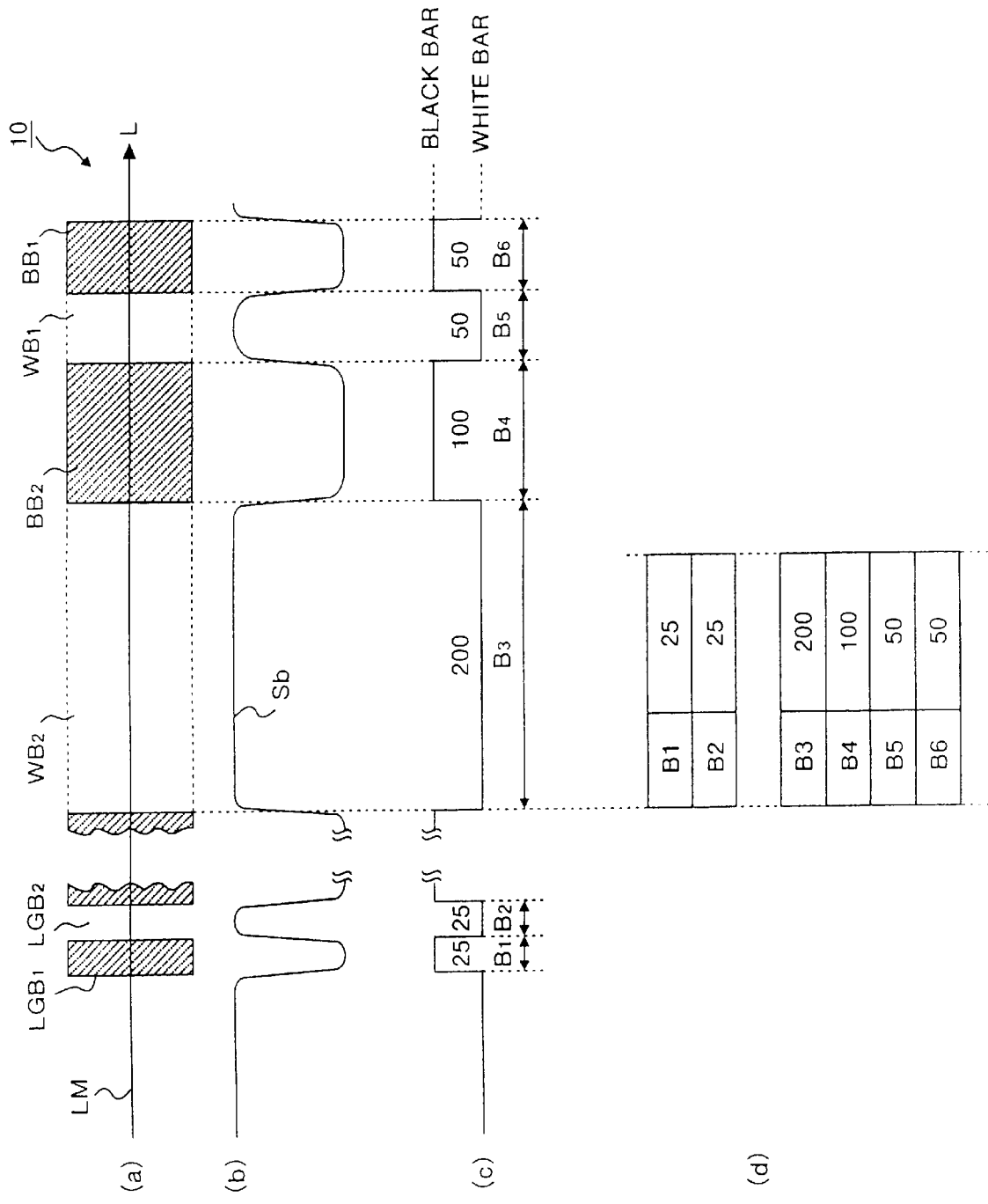
FIG. 2 is a diagram for explaining the operation of a scanner 20 shown in FIG. 1 and a scanner 1 shown in FIG. 8.

An A/D converter 22 compares the read signal Sb from the photoelectric converter 21 with a threshold value, thereby to change (digitize) the read Sb into a binary data, in a similar manner to that of the above A/D converter 3 (refer to FIG. 8). A clock signal generator 23 generates a clock signal Sc having a predetermined period, in a similar manner to that of the above clock signal generator 4 (refer to FIG. 8). A bar-width counter 24 counts up in synchronism with the period of the clock signal Sc supplied from the clock signal generator 23, and measures as count values a black-bar width $B_1$, a white-bar width $B_2$, a white-bar width $B_3$, a black-bar width $B_4$, a white-bar width $B_5$, and a black-bar width $B_6$, out of the read signal Sb digitized by the A/D converter 22, as shown in FIG. 2(*b*), in a similar manner to that of the above bar-width counter 5 (refer to FIG. 8).

A storage 26 stores a first demodulation table 100 (refer to FIG. 13), a second demodulation table 200 (refer to FIG. 14), and a program that is executed by a scanner controller 25. The storage 26 also stores a questionable character table T shown in FIG. 3. This questionable character table T will be explained in detail later.

The scanner controller 25 demodulates characters of the bar code 10, based on the count value data from the bar-width counter 24, the first demodulation table 100 (refer to FIG. 13), and the second demodulation table 200 (refer to FIG. 14), and outputs a result of the demodulation as a demodulation data $D_m$, in a similar manner to that of the above scanner controller 6 (refer to FIG. 8). The operation of the scanner controller 25 will be explained in detail later. A communication section 27 carries out communications with a communication section 32 in a POS device 30 according to a predetermined communication protocol.

The POS device 30 displays prices of goods (not shown) and names of the goods that are attached with the bar codes 10, and generates sales management information, based on the demodulation $D_m$. In this POS device 30, a POS controller 31 controls each section. The operation of the POS controller 31 will be explained in detail later. A storage 33 stores various kinds of data.

An operator display 34 is a CRT (cathode-ray tube) or an LCD (liquid crystal display) for carrying out various kinds of display for an operator. A customer display 35 is a CRT or an LCD for displaying names of goods, sub-total amount, and total amount for customers. A keyboard 36 consists of ten-keys from a key "0" to a key "9", and a key F having functions as a functional key.

A speaker 37 gives an alarm based on the control of the POS controller 31. A printer 38 prints out receipts and the like. A cash drawer 39 stores and manages cash. A host communication section 40 transmits POS data according to sales and goods stock information to a host 60 via a network 50.

Figure 4:
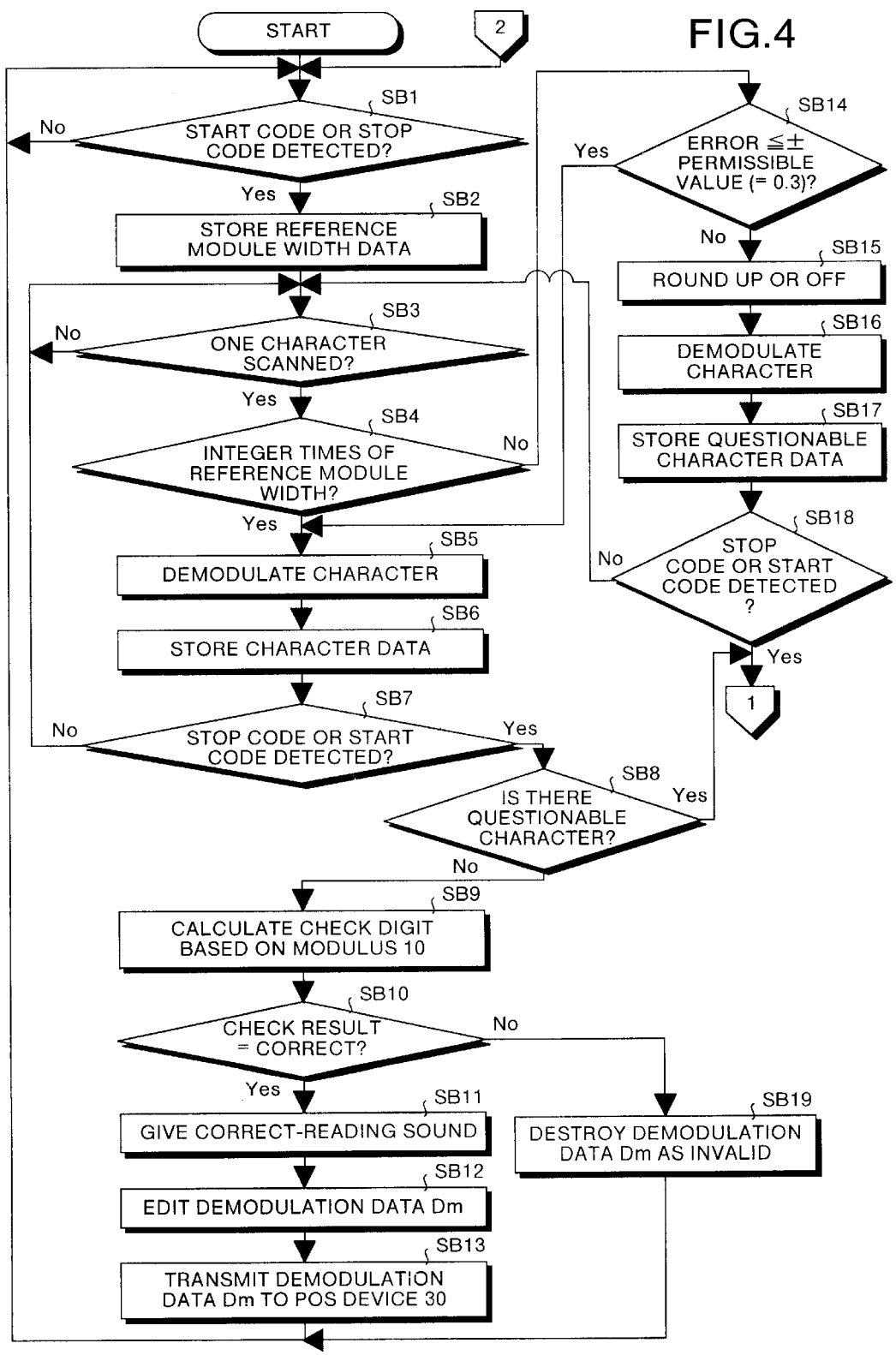
FIG. 4 is a flowchart for explaining the operation of the scanner 20 shown in FIG. 1.
Figure 5:
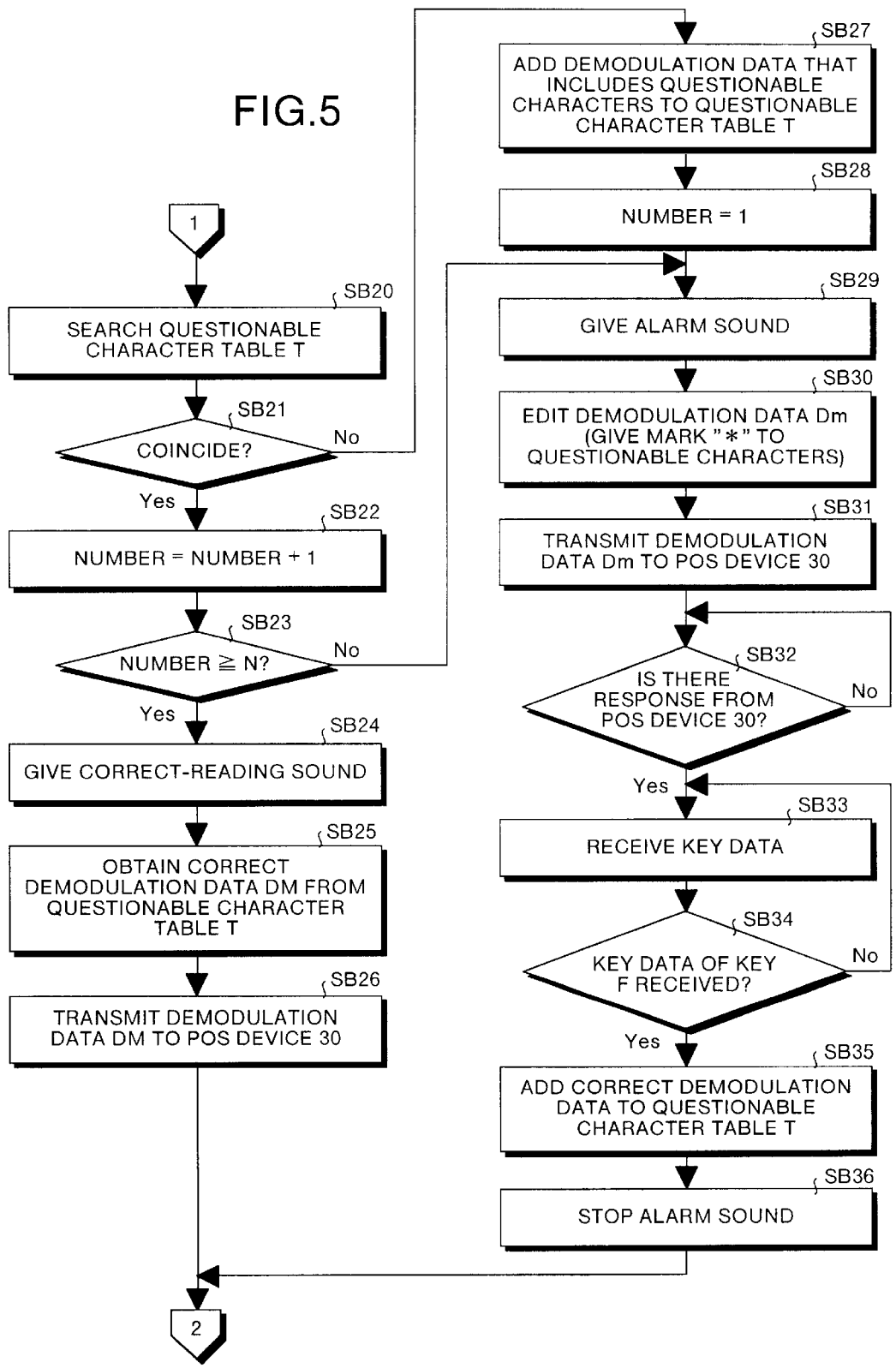
FIG. 5 is a flowchart for explaining the operation of the scanner 20 shown in FIG. 1.
Figure 6:
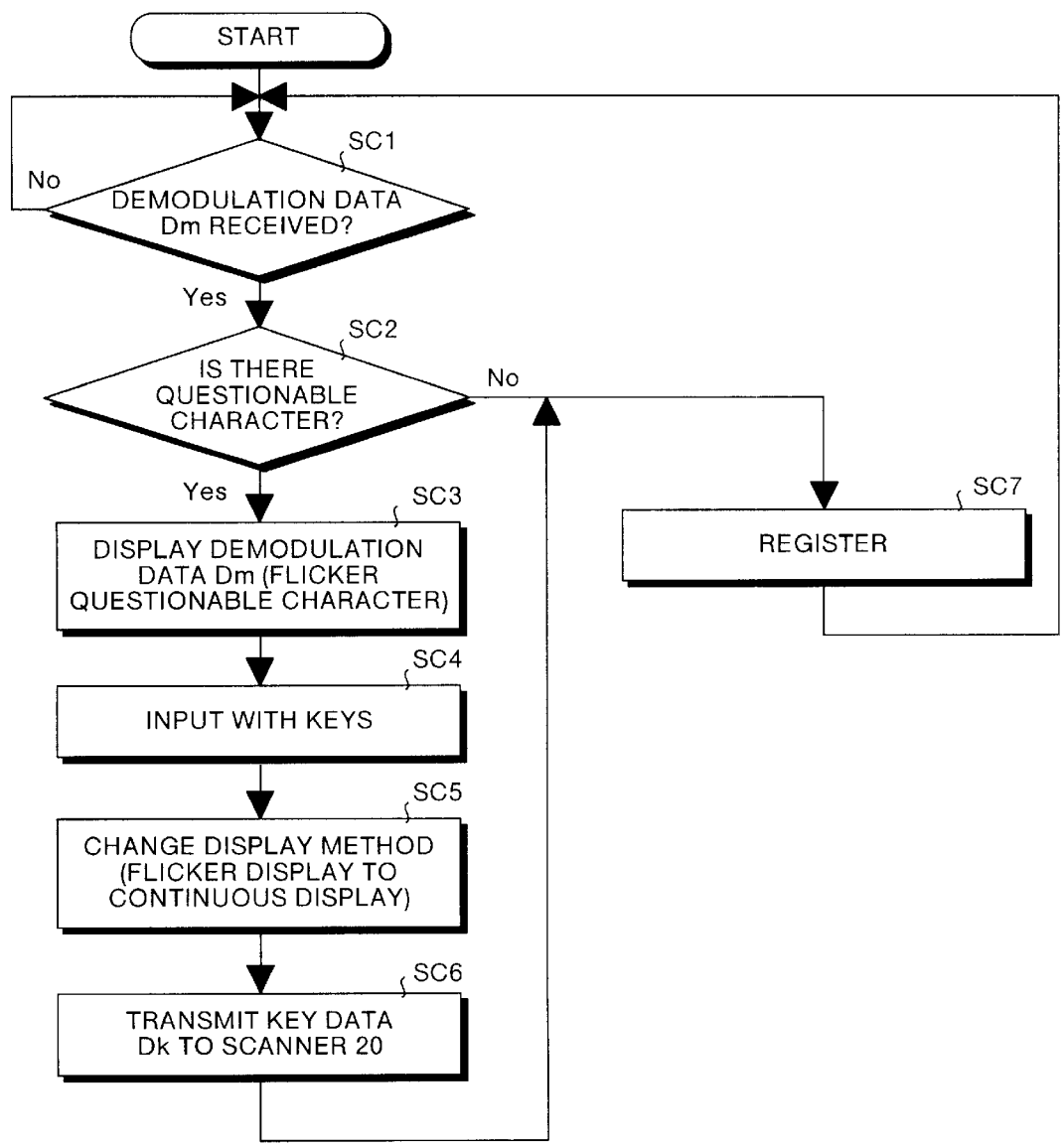
FIG. 6 is a flowchart for explaining the operation of a POS device shown in FIG. 1.

The operation of one embodiment will be explained next with reference to flowcharts shown in FIG. 4 to FIG. 6. FIG. 4 and FIG. 5 are flowcharts for explaining the operation of the scanner 20 shown in FIG. 1, and FIG. 6 is a flowchart for explaining the operation of the POS device 30 shown in FIG. 1.

In FIG. 1, when the laser beams L have been irradiated onto the bar code 10 from the laser oscillator (not shown) of the photoelectric converter 21 for reading the bar code, the laser beams L are reflected at the reflectance corresponding to the distribution of black bars and white bars of the bar code 10. Then, the reflected laser beams L are received by the receiver (not shown) of the photoelectric converter 21. Consequently, in the receiver of the photoelectric converter 21, the reflected beams are converted into the read signal Sb having the waveform as shown in FIG. 2(*b*), and then the read signal Sb is output to the A/D converter 22. The A/D converter 22 compares the input read signal Sb with a threshold value, and changes the read signal Sb into a binary data. The binary read signal Sb is counted by the bar-width counter 24. The counted result is delivered to the scanner controller 25.

Figure 12:
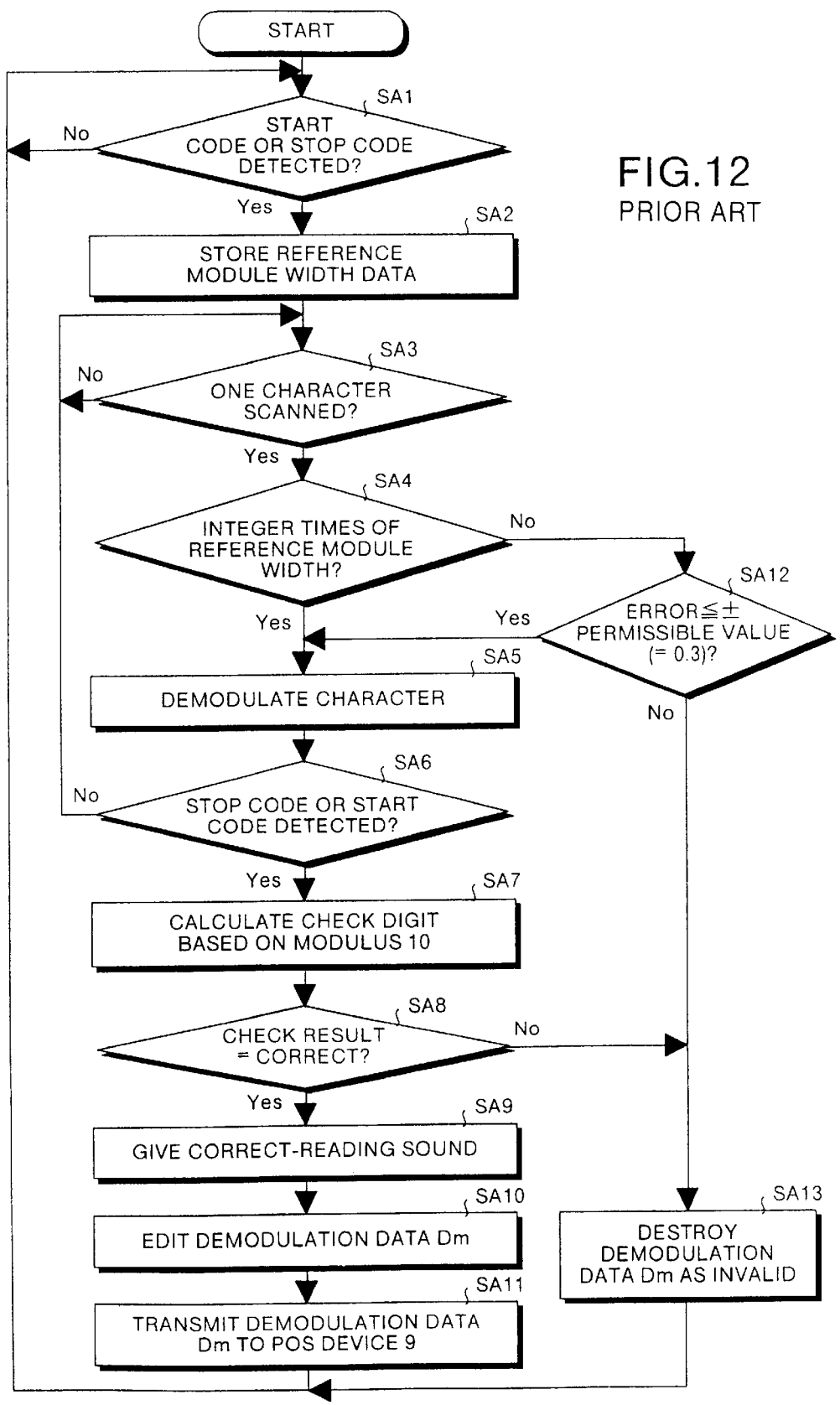
FIG. 12 is a flowchart for explaining the operation of the conventional bar-code reader.

The scanner controller 25 proceeds to step SB1 shown in FIG. 4, and decides whether a start code or a stop code has been detected or not, based on the counted result, in a similar manner to that at step SA1 (refer to FIG. 12). When a result of the decision made is "No", the same process of making a decision is repeated. When a start code corresponding to the left guard bar LGB has been detected, the scanner controller 25 sets "Yes" as a result of the decision made, and proceeds to step SB2. At step SB2, the scanner controller 25 stores the black-bar width $B_1$ of the black bar $LGB_1$ (=25 counts) shown in FIG. 2(*a*) and FIG. 2(*b*) into the storage 26, as a reference module width, in a similar manner to that at step SA2 (refer to FIG. 12), and then proceeds to step SB3.

At step SB3, the scanner controller 25 decides whether black bars and white bars corresponding to one character have been scanned or not, in a similar manner to that at step SA3 (refer to FIG. 12). When a result of the decision made is "No", the same process of making a decision is repeated. When a result of the decision made at step SB3 is "Yes", the scanner controller 25 proceeds to step SB4.

At step SB4, the scanner controller 25 decides whether or not the number of modules as a result of totaling the white bars and the black bars for one character scanned at step SB3 (that is, seven modules, when there is no thinning in black or thickening in black) is an integer times the number of the reference modules, in a similar manner to that at step SA4 (refer to FIG. 12). When a result of the decision made is "Yes", the scanner controller 25 proceeds to step SB5.

At step SB5, the scanner controller 25 demodulates the character by using the first demodulation table 100 (refer to FIG. 13) and the second demodulation table 200 (refer to FIG. 14), in a similar manner to that at step SA5 (refer to FIG. 12), and proceeds to step SB6. At step SB6, the scanner controller 25 makes the demodulated data stored in the storage 26, and proceeds to step SB7.

At step SB7, the scanner controller 25 decides whether a stop code or a start code has been detected or not. When a result of the decision made is "No", the scanner controller 25 returns to step SB3, and repeats the above operation according to the next character.

When the character has been thinned in black or thickened in black as shown in FIG. 15(*b*) or FIG. 15(*c*), the number of modules for one character does not become an integer times the number of the reference modules. Therefore, in this case, the scanner controller 25 sets "No" as a result of decision made at step SB4, and then proceeds to step SB14. At step SB14, the scanner controller 25 decides whether a value of a decimal point portion (an error) of a ratio of the number of modules for one character to the number of the reference modules is equal to or less than a permissible value (for example, ±0.3) or not, in a similar manner to that at step SA12 (refer to FIG. 12). When a result of the decision made is "Yes", the scanner controller 25 proceeds to step SB5.

When a result of the decision made at step SB14 is "No", the scanner controller 25 proceeds to step SB15. At step SB15, the scanner controller 25 divides the number of modules for one character obtained at step SB4 by the number of the basic modules, and rounds up or off this quotient. Then, the scanner controller 25 proceeds to step SB16. At step SB16, the scanner controller 25 demodulates the character by using the first demodulation table 100 (refer to FIG. 13) and the second demodulation table 200 (refer to FIG. 14), as a result of the rounding up or off at step SB15, in a similar manner to that at step SA5 (refer to FIG. 12), and proceeds to step SB17.

At step SB17, the scanner controller 25 sets the character demodulated at step SB16 as a questionable character, and makes a questionable character data corresponding to this questionable character stored in the storage 26, and proceeds to step SB18. In this case, the questionable character means a character having a possibility that the result of demodulation is an error because the error exceeds a permissible value or because the quotient has been rounded up or off.

At step SB18, the scanner controller 25 decides whether a stop code or a start code has been detected or not. In this case, a result of the decision made is "No", and the scanner controller returns to step SB3 and repeats the above operation according to the next character.

When the demodulation of all characters according to the bar code 10 (refer to FIG. 9) has been finished and also when a result of the decision made at step SB18 becomes "Yes", the scanner controller 25 proceeds to step SB20 shown in FIG. 5. In this case, assume that a demodulation data "2000000*88963*8" that includes questionable characters has been obtained as a result of demodulating the character that has a normal demodulation data "2000000289632" shown in FIG. 9. In this case, a questionable character is attached with a "*" mark. Accordingly, in the demodulation data "2000000*88963*8" that includes questionable characters, "*8" and "*8" are questionable characters.

At step SB20, the scanner controller 25 searches the questionable character table T shown in FIG. 3, by using the demodulation data "2000000*88963*8" that includes questionable characters as a key. Then, the scanner controller 25 proceeds to step SB21. This questionable character table T is a table that shows a relationship between the demodulation data that includes questionable characters corresponding to the correct demodulation data ("2000000289632" in this drawing), and the number of demodulation. In this drawing, the questionable characters are attached with the "*" mark.

At step SB21, the scanner controller 25 decides whether there exists a demodulation data that coincides with the demodulation data "2000000*88963*8" that includes questionable characters, in the questionable character table T or not. In this case, a result of the decision made is "Yes", and the scanner controller proceeds to step SB22. At step SB22, the scanner controller 25 increments the number (=12) corresponding to the demodulation data "2000000*88963*8" that includes questionable characters in the questionable character table T, by one (=13), and proceeds to step SB23.

At step SB23, the scanner controller 25 decides whether the number after the incrementing by one becomes equal to or above a threshold value N (for example, 15), or not. This threshold value N is used for deciding whether a demodulation data that includes a questionable character should be regarded as a correct data or not. In this case, the number (=13) corresponding to the demodulation data "2000000*88963*8" that includes questionable characters is less than the threshold value (=15). Therefore, the scanner controller 25 sets "No" as a result of the decision made at step SB23, and proceeds to step SB29.

At step SB29, the scanner controller 25 sounds an alarm, and then proceeds to step SB30. At step SB30, the scanner controller 25 edits the demodulation data that includes questionable characters attached with the "*" marks ("2000000*88963*8": refer to FIG. 3), that is, the demodulation data $D_m$, and then proceeds to step SB31. At step SB31, the scanner controller 25 transmits the demodulation data $D_1$ to the POS device 30 shown in FIG. 1, and then proceeds to step SB32. At step SB32, the scanner controller 25 decides whether there has been a response from the POS device 30 or not. In this case, the scanner controller 25 sets "No" as a result of the decision made, and repeats the same process of making a decision.

On the other hand, at step SC1 shown in FIG. 6, the POS controller 31 in the POS device 30 shown in FIG. 1 decides whether the demodulation data $D_m$ has been received from the scanner 20 or not. In this case, the POS controller 31 sets "No" as a result of the decision made, and repeats the same process of making a decision. When the communication section 32 has received the demodulation data $D_m$ that includes the questionable characters ("2000000*88963*8") that has been transmitted at step SB31 (refer to FIG. 5), the POS controller 31 sets "Yes" as a result of the decision made at step SC1, and proceeds to step SC2.

At step SC2, the POS controller 31 decides whether the demodulation data $D_m$ ("2000000*88963*8") received at step SC1 includes a questionable character or not. In this case, there are the questionable characters "*8" and "*8". Therefor, the POS controller 31 sets Yes" as a result of the decision made at step SC2, and proceeds to step SC3. When a result of the decision made at step SC2 is "No", the POS controller 31 proceeds to step SC7.

Figure 7:
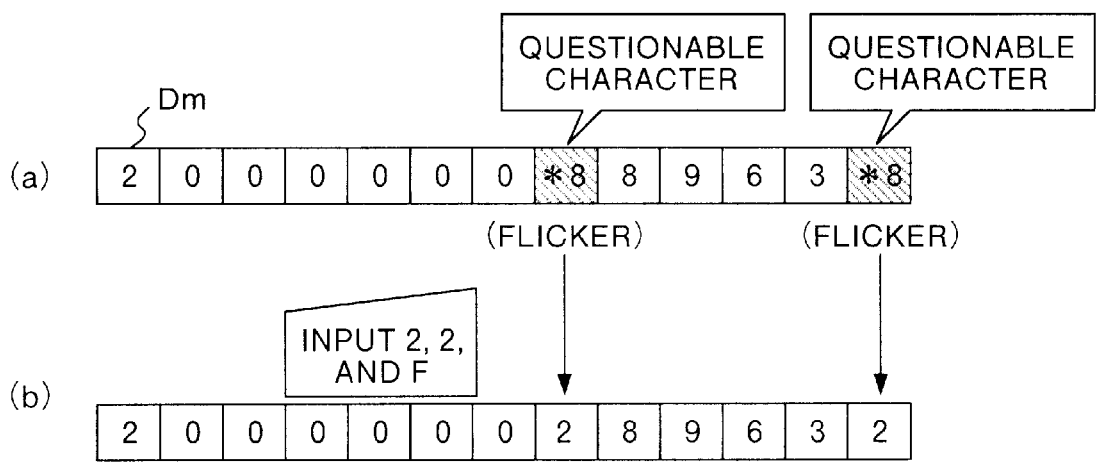
FIG. 7 is a diagram showing a display example of an operator display shown in FIG. 1.

In this case, at step SC3, the POS controller 31 makes the demodulation data that includes the questionable characters ("2000000*88963*8") displayed on the operator display 34 (refer to FIG. 1), as shown in FIG. 7(a). The POS controller 31 flickers the display of the questionable characters "*8" and "*8", as shown in FIG. 7(a).

Figure 9:
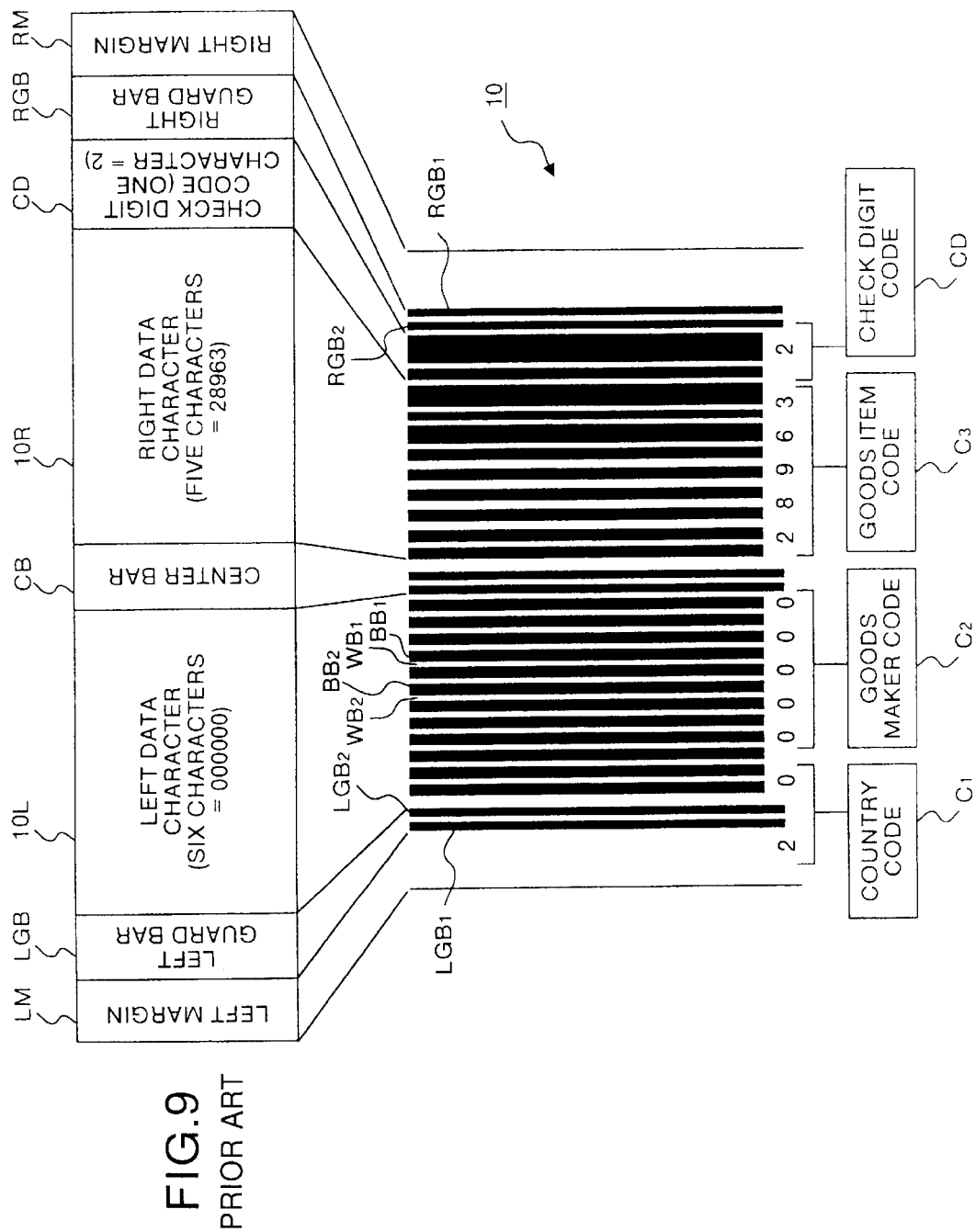
FIG. 9 is a block diagram showing a structure of a bar code 10.
Figure 10:
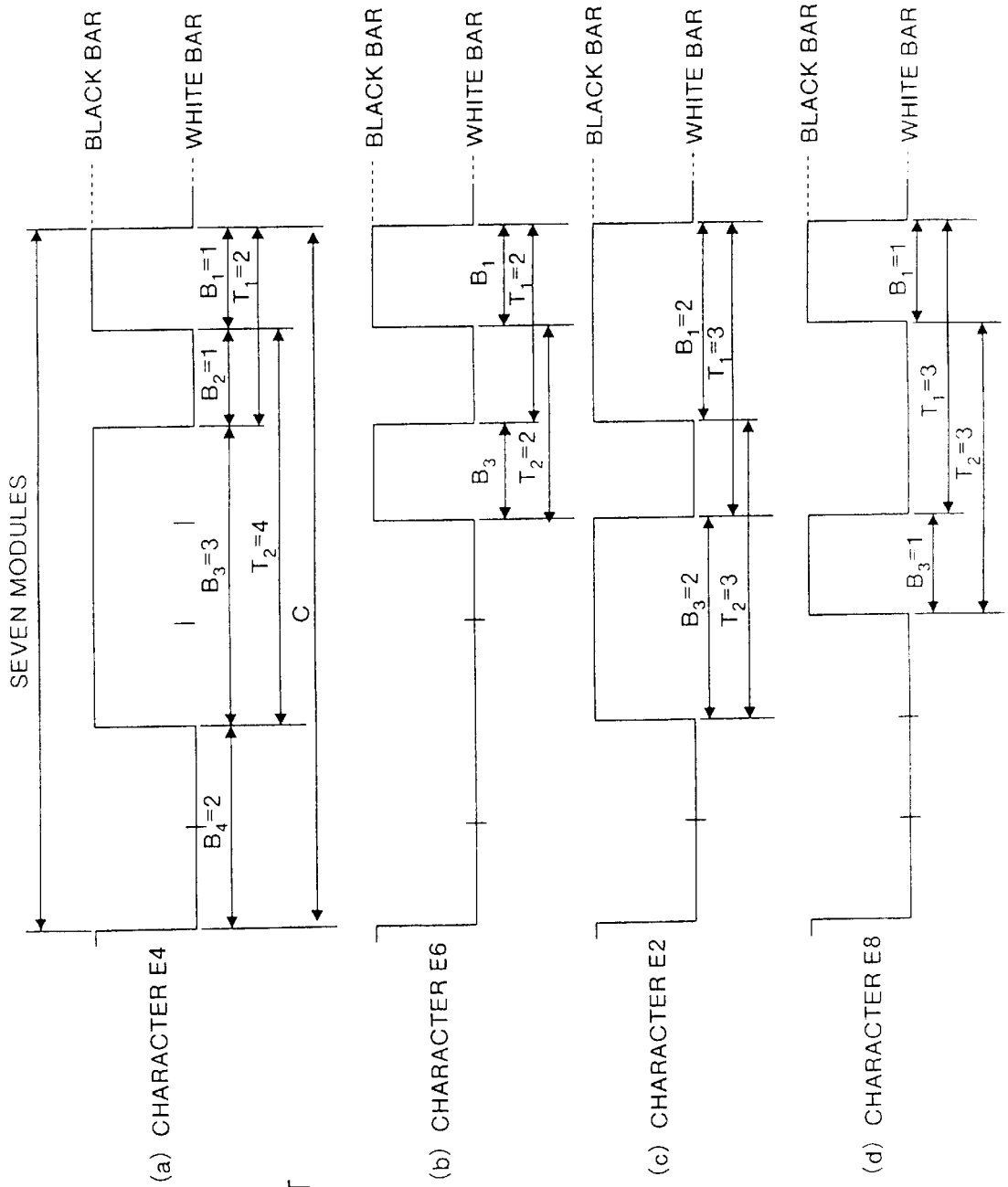
FIG. 10 is a diagram showing characters E4, E6, E2, and E8.
Figure 11:
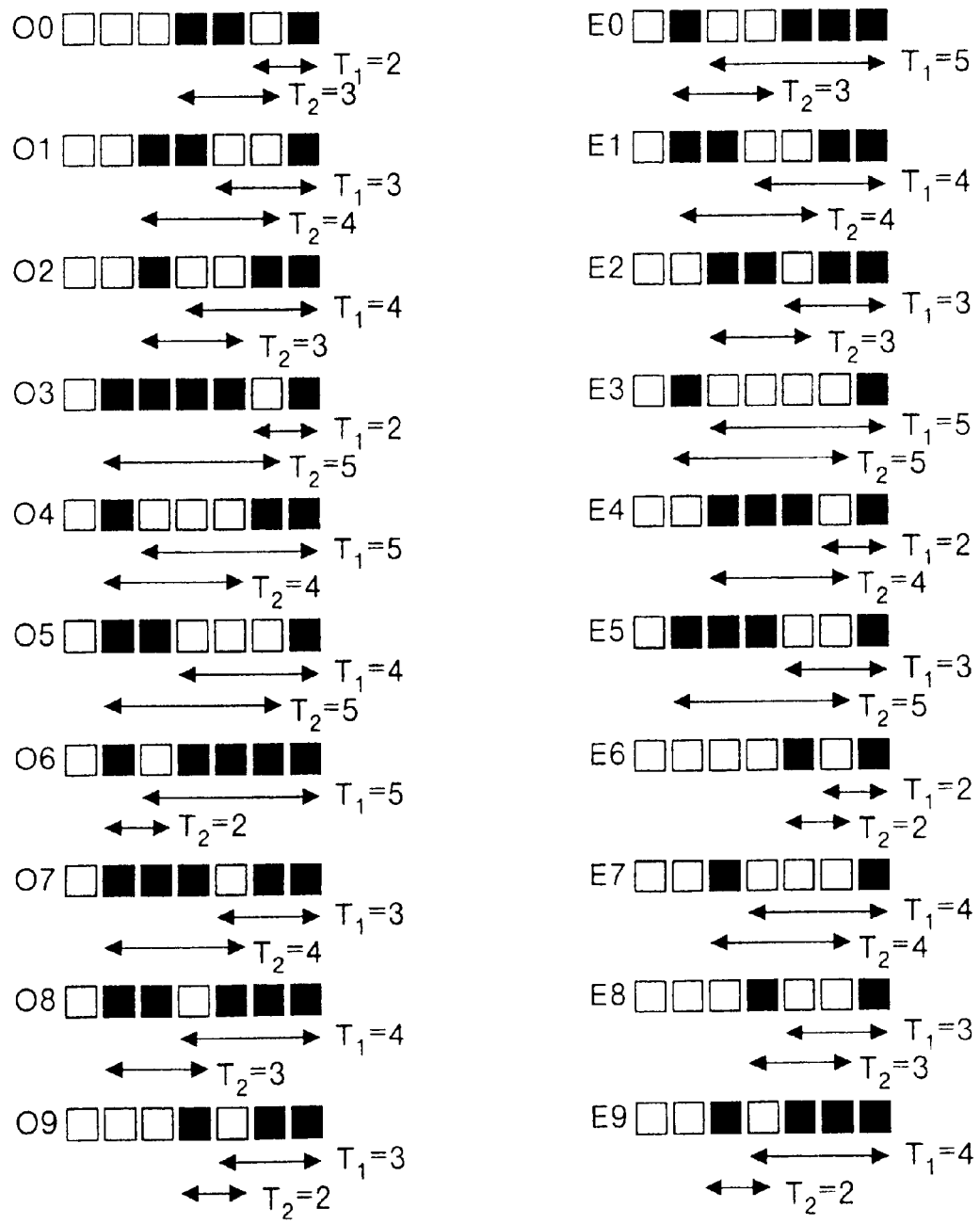
FIG. 11 is a diagram showing characters O0 to O9 and E0 to E9.

At step SC4, the operator confirms the questionable characters on the display screen (refer to FIG. 7(a)) of the operator display 34, and then confirms the characters described in the actual bar code 10 shown in FIG. 9 corresponding to the questionable characters. In this case, the questionable characters "*8" and "*8" correspond to the characters "2" and "2" shown in FIG. 9. Next, the operator inputs the characters "2" and "2" from the ten keys on the keyboard 36, and depresses the key E that means the completion of the input.

At step SC5, the POS controller 31 receives the key input, and changes a display method on the operator display 34 from the display shown in FIG. 7(a) to a display shown in FIG. 7(b), and then proceeds to step SC6. As shown in FIG. 7(b), the questionable characters "*8" and "*8" are changed to the normal characters "2" and "2", and the flickering display is changed to a continuous display.

At step SC6, the POS controller 31 transmits a key data $D_k$ corresponding to the "2", "2", and "F" that have been input at step SC4, to the scanner 20 via the communication section 32, and then proceeds to step SC7. At step SC7, the POS controller 31 registers the correct demodulation data $D_m$ shown in FIG. 7(b) into the storage 33, and returns to step SC1 and repeats the above operation.

When there has been a response from the POS device 30, the scanner controller 25 sets "Yes" as a result of the decision made at step SB32 shown in FIG. 5, and proceeds to step SB33. At step SB33, the scanner controller 25 receives the key data $D_k$ transmitted at step SC6 (refer to FIG. 6), and then proceeds to step SB34. At step SB34, the scanner controller 25 decides whether the data of the key F included in the key data $D_k$ has been received or not. In this case, the scanner controller 25 sets "Yes" as a result of the decision made, and proceeds to step SB35. When a result of the decision made at step SB34 is "No", the scanner controller 25 returns to step SB33, and repeats the above operation.

At step SB35, the scanner controller 25 adds the correct demodulation data $D_m$ ("2000000289632") to the questionable character table T shown in FIG. 3, based on the "2" and "2" included in the key data $D_k$, and then proceeds to step SB36. When the correct demodulation data $D_m$ already exists in the questionable character table T, the scanner controller 25 skips the processing at step SB35. At step SB36, the scanner controller 25 stops sounding the alarm, and returns to step SB1 shown in FIG. 4, and repeats the above operation.

When a result of the decision made at step SB21 shown in FIG. 5 is "No", the scanner controller 25 proceeds to step SB27. At step SB27, the scanner controller 25 adds the demodulation data that includes the questionable characters, to the questionable character table T (refer to FIG. 3), and proceeds to step SB28. At step SB28, the scanner controller 25 sets 1 as the number corresponding to the added demodulation data that includes the questionable characters, in the questionable character table T, and then proceeds to step SB29. At step SB30 afterward, the scanner controller 25 carries out the same operation as that explained above.

When a result of the decision made at step SB23 is "Yes", the scanner controller 25 proceeds to step SB24. At step SB24, the scanner controller 25 gives a correct-reading sound that means that the reading has been carried out correctly, and proceeds to step SB25. At step SB25, the scanner controller 25 obtains the correct demodulation data $D_m$ ("2000000289632") from the questionable character table T, and then proceeds to step SB26. At step SB26, the scanner controller 25 transmits the correct demodulation data $D_m$ to the POS device 30 via the communication section 27, and then returns to step SB1 shown in FIG. 4 and repeats the above operation.

When a result of the decision made at step SB7 shown in FIG. 4 is "Yes", the scanner controller 25 proceeds to step SB8. At step SB8, the scanner controller 25 decides whether there is a questionable character in the result of the character demodulation or not. When a result of the decision made is "Yes", the scanner controller 25 proceeds to step SB20 shown in FIG. 5 and repeats the above operation.

On the other hand, when a result of the decision made at step SB8 shown in FIG. 4 is "No", that is, when the character has been demodulated correctly, the scanner controller 25 proceeds to step SB9. At step SB9, the scanner controller 25 calculates a check digit based on a known modulus 10, in a similar manner to that at step SA7 (refer to FIG. 12), and then proceeds to step SB10.

At step SB10, the scanner controller 25 checks whether the check digit calculated at step SB9 coincides with the check digit code CD of the character actually demodulated (refer to FIG. 9), and decides whether the check result has been correct or not. When a result of the decision made is "No", the scanner controller 25 proceeds to step SBl9, and destroys the demodulation data $D_m$. Then, the scanner controller 25 returns to step SB1.

On the other hand, when a result of the decision made at step SB10 is "Yes", the scanner controller 25 proceeds to step SB11. At step SB11, the scanner controller 25 gives a correct-reading sound to notify that the reading has been correct, and then proceeds to step SB12. At step SB12, the scanner controller 25 edits the demodulation data $D_m$, and proceeds to step SB13. At step SB13, the scanner controller 25 transmits the edited demodulation data $D_m$ to the POS device 30 via the communication section 27, and returns to step SB1. Then, the POS controller 31 sets "Yes" as a result of the decision made at step SC1 shown in FIG. 6, and executes the processing at step SC2 afterward.

In the above embodiment, it may be arranged such that bar codes of low print precision are statistically found based on the questionable character table T, and a result of this finding is transmitted to the host 60 from the POS device 30 via the network 50. In this case, the host can collect the bar codes of low print precision, and urge the bar-code printing maker to improve the print precision, based on a result of this collection.

As explained above, according to the above embodiment, the number of modules that includes an error component is rounded up or off, and a character basically read as a reading error is displayed on the operator display 34 as a questionable character attached with a "*" mark as shown in FIG. 7(a). Then, a correct character corresponding to this questionable character 10 is input. Therefore, it is not necessary to input all characters of the bar code 10. As a result, it is possible to reduce the load of the operator.

Further, according to the above embodiment, the questionable character table T (refer to FIG. 3) is provided. When a result of counting (number) at step SB23 (refer to FIG. 5) is equal to or above a threshold value N, the questionable character is regarded as a correct character, and the correct demodulation result $D_m$ in the questionable character table T is displayed on the operator display 34. Therefore, a troublesome input operation by the operator is not necessary. As a result, it is possible to read the bar code without applying load to the operator.

Further, according to the above embodiment, the operator display 34 can display questionable characters distinctly differently from other characters based on different display methods. Therefore, it is possible to input the correct character easily from the keyboard 36.

Further, according to the above embodiment, when the correct character has been input from the keyboard 36, the questionable character is replaced with the correct character. At the same time, all characters are displayed in the same display method. Therefore, the operator can instantly recognize that the questionable character has been replaced.

As explained above, in the bar-code reader and the bar-code reading method according to the present invention, a number of modules that includes an error component is corrected, and a character that is basically a reading error is displayed by the display unit as a questionable character that is attached with a mark. Then, a correct character corresponding to this questionable character is input. Therefore, it is not necessary to input all characters of the bar code. As a result, there is an effect that it is possible to reduce the load of the operator.

Further, in the bar-code reader according to the present invention, the table and the count unit are provided. When a result of counting by the count unit is equal to or above a threshold value, the questionable character is regarded as a correct character, and the result of correct demodulation in the table is displayed by the display unit. Therefore, a troublesome input operation by the operator is not necessary. As a result, there is an effect that it is possible to read the bar code without applying load to the operator.

Further, in the bar-code reader according to the present invention, the display unit can display questionable characters distinctly differently from other characters based on different display methods. Therefore, there is an effect that it is possible to input the correct character easily from the input unit.

Further, in the bar-code reader according to the present invention, when a correct character has been input by the input unit, a questionable character is replaced with the correct character. At the same time, all characters are displayed in the same display method. Therefore, there is an effect that the operator can instantly recognize that the questionable character has been replaced.

Further, in the bar-code reader according to the present invention, there is an effect that it is possible to make the display unit display the questionable character distinctly differently from other characters, based on different display methods.

Further, in the bar-code reader according to the present invention, a character is corrected by replacing a questionable character with a correct character, based on the input from the input unit. Therefore, it is not necessary to input all characters of the bar code. As a result, there is an effect that it is possible to reduce the load of the operator.

Further, in the bar-code reader according to the present invention, when a result of demodulation that includes a questionable character has been obtained and also when a result of demodulation that is the same as this result of demodulation exists in the memory unit, the control unit outputs the result of corrected demodulation in place of the result of demodulating the bar code. Therefore, a troublesome input operation by the operator is not necessary. As a result, there is an effect that it is possible to read the bar code without applying load to the operator.

INDUSTRIAL APPLICABILITY

As explained above, the bar-code reader and the bar-code reading method according to the present invention are useful for reading a bar code having low print precision.

What is claimed is:

1. A bar-code reader for demodulating a character based on a number of modules obtained by reading a bar code that expresses said character in a plurality of bar widths, the bar-code reader comprising:
    a ratio calculation unit which obtains a ratio of a number of modules to a reference module width of said character;
    a correction unit which corrects said number of modules that includes an error component, when an error amount in the ratio exceeds a permissible value;
    a demodulation unit which demodulates a character, based on the number of modules of said character and the number of modules corrected by the correction unit;
    a display unit which displays a marked questionable character corresponding to the corrected number of modules, in a result of demodulation by the demodulation unit;
    an input unit which inputs a correct character based on the display of the display unit;
    a memory unit which stores a table for expressing a relationship between a result of correct demodulation obtained by replacing said questionable character in the result of demodulation by the demodulation unit with said correct character input by the input unit, and a result of demodulation that includes said questionable character,
    a count unit which counts the number of times when the result of demodulation that includes said questionable character in said table has been obtained, and
    a control unit which makes the display unit display the result of correct demodulation in said table when the result of counting by the count unit is equal to or above a threshold value, in the case where a result of demodulation that includes said questionable character has been obtained by the demodulation unit and also when the result of demodulation exists in said table.

2. The bar-code reader according to claim 1, wherein the display unit displays said questionable character based on a display method different from that used for displaying other characters.

3. The bar-code reader according to claim 2, wherein the display unit replaces said questionable character with said correct character that has been input by the input unit, and displays all characters in the same display method.

4. A bar-code reader to read and demodulate a bar code having a plurality of characters, the bar-code reader comprising:
    a decision unit which decides presence or absence of a questionable character having a possibility of erroneous reading among the characters included in said bar code;
    a display unit which displays a result of demodulating said bar code;
    a control unit which makes the display unit, display the questionable character included in the result of demodulation differently from other characters, when the decision unit has decided that there is said questionable character;
    an input unit which inputs a correct character corresponding to said questionable character, wherein the control unit replaces said questionable character with said correct character, and outputs a result of demodulation that includes the correct character as a result of corrected demodulation;
    a memory unit which stores the result of demodulation that includes said questionable character and the result of corrected demodulation, by relating these results to each other; and
    a comparison unit which compares the result of demodulating said bar code with the result of demodulation that includes said questionable character that is stored in the memory unit, wherein when the comparison unit shows a result of the comparison that the result of demodulating said bar code and the result of demodulation that includes said questionable character coincide with each other, the control unit outputs the result of corrected demodulation that is stored in the memory unit in place of the result of demodulating said bar code.

* * * * *